United States Patent [19]

Bach

[11] 4,120,575
[45] Oct. 17, 1978

[54] TEST TUBE PROJECTION SYSTEM AND METHOD

[76] Inventor: Bert Bach, 270 West End Ave., New York, N.Y. 10023

[21] Appl. No.: 814,261

[22] Filed: Jul. 11, 1977

Related U.S. Application Data

[63] Continuation-in-part of Ser. No. 740,002, Nov. 8, 1976, abandoned.

[51] Int. Cl.² .................. G02B 21/36; G03B 21/22; G01N 21/00
[52] U.S. Cl. .................................. 353/39; 353/75; 356/197
[58] Field of Search .............. 356/164, 165, 166, 197, 356/39; 353/74, 75, 76, 77, 78, 39; 350/125, 126

[56] References Cited

U.S. PATENT DOCUMENTS

| 2,731,725 | 1/1956 | Stefacek | 33/125 A |
| 3,208,337 | 9/1965 | Appeldorn | 353/DIG. 6 |
| 3,240,113 | 3/1966 | Stechemesser et al. | 353/99 |
| 3,850,516 | 11/1974 | Mallinson et al. | 353/122 |

Primary Examiner—Steven L. Stephan
Attorney, Agent, or Firm—Eliot S. Gerber

[57] ABSTRACT

A system for the projection of the magnified image of the liquid contents on the wall of a test tube includes a light-tight cabinet, a light source, a test tube holding means which preferably positions the test tube at an angle of 10°–40° from the horizontal, a projection lens and a rear viewing screen.

9 Claims, 2 Drawing Figures

TEST TUBE PROJECTION SYSTEM AND METHOD

BACKGROUND OF THE INVENTION

The present application is a continuation-in-part application of U.S. Ser. No. 740,002, filed Nov. 8, 1976 now abandoned.

The present invention relates to an image projection system for use in a laboratory and more particularly to such a projection system in which the projected image is of part of the liquid contents of a test tube.

At the present time the liquid contents of a test tube may be examined in various ways. A test tube may contain a liquid such as a chemical reagent, a chemical sample or a body fluid which can be regarded visually by holding the test tube to the light and permitting the light to shine through the liquid. It is also known that a visual examination may be made macroscopically by tilting the test tube to obtain a layer of liquid and regarding the later of material within the test tube using a hand-held magnifying lens. Generally a closer examination of the liquid contents requires the aid of an enlarging optical microscope.

The general procedure in microscopic examination is to remove a small portion of the liquid material in the test tube using a pipette or other device. The removed sample is placed on a glass microscope slide, the liquid is spread on the slide and the slide is placed on the microscope stage of the microscope. The optics of the microscope is then adjusted to the user's particular vision requirements. It is usually necessary for a second person, because of vision differences, to readjust the adjustment knobs on the microscope if he wishes to view the same slide. Alternatively, it is possible for more than one person to see the material on the microscope slide by using a microscope projector or a special type of microscope having dual eyepieces which are individually adjusted to permit simultaneous viewing by two persons. Microscope projections beam light through the microscope slide and through an optical system, for example, the optical system of a microscope, and project the image on a screen. Microscope projectors, for example, of the type shown in U.S. Pat. No. 3,775,004, are relatively expensive and are not often used in the day-to-day operation of a laboratory. Microscope projectors generally may not be used with a liquid sample because heat from their lamp will dry out the sample.

In those laboratories examining blood samples it is known that certain important tests may be seen at a magnification ratio in the range of 40 to 100 to 1. Generally these tests are performed by removing a sample of blood and placing it on a slide, and placing the slide in a microscope stage. That procedure is time consuming. In addition, some laboratory technicians have difficulty in accurately viewing material through a microscope. This procedure also does not provide a common image which may be discussed by the laboratory personnel.

It has been recognized that it would be preferable to view an enlarged image of the contents of a test tube while the material is still in the test tube. Such a device would be particularly useful in blood banks and immuno-hematology laboratories for the detection of red cell antigen-antibody reactions which are obtained by mixing serum with samples of red blood cells. The result of the test is either the presence or the absence of hemagglutination, which is the agglutination of blood corpuscles.

The article entitled "A Pocket-Size Microscope For Reading Megagglutination in the Test Tube," by T. E. Allen, Jr., describes a special-purpose hand-held microscope having a single eyepiece in which, in effect, the microscope slide in the usual microscope is replaced by the entire test tube. This device has not found widespread application in laboratories possibly because it has a short field of focus, which means that the positioning of the test tube and the thickness and positioning of the liquid on the test tube wall becomes critical for proper viewing.

It has also been suggested that a photographic color film slide may be filmed through a microscope. This photographic film slide may then be developed and its image projected using a conventional photographic slide projector. This system is relatively expensive and very time consuming. It is necessary to have a special adapter on the microscope to take photographs, and it is necessary to develop the slide pictures from the slide film and mount them suitably for use in a slide projector. This entire process may take days or even weeks and it is not practical in those laboratories in which hundreds or even thousands of tests are performed each day.

The use of curved screens has been suggested in various film projection systems, for example, in the projection of wide screen motion pictures. Curved screens have also been suggested for obtaining a wide-angle image in a film projection system, as in U.S. Pat. No. 3,142,223.

The U.S. Pat. No. 3,850,516 to Mallinson et al. shows a curved projection screen, a segment of a sphere, or cylinder, which is viewed from within the curvature of the screen using an arc light point light source and a toric lens. It is not a rear projection screen and is not used to see the contents on the wall of a test tube.

In U.S. Pat. No. 3,208,337 to Appeldorn an overhead projector is used to display test tubes. The test tubes are vertical and light is shined through their contents. A conventional front view projector screen is utilized.

In U.S. Pat. No. 2,544,629 to Davis et al a cylindrical capillary tube is laid horizontally and viewed through an optical system including a mirror and lens. The tube is lighted from its rear surface. There is no projection of the image and the view is of the contents, rather than the material forming a layer on its wall. The capillary tube is not rotated.

The hypothetical combination of the Davis and Mallinson patents would give a horizontal capillary tube having light shined through it. The image would be viewed from within the screen. That combination would not show a means to permit rotation of a test tube or a rear projection screen.

In U.S. Pat. No. 3,658,415 to Miles a rear view flat screen is used in a microfilm projector. The microfilm is a flat film.

In U.S. Pat. No. 2,959,097 to Mollring an illuminating device for microscopes includes a light bulb, a plurality of lenses and a reflecting mirror. The device, according to the patent description, permits photography of objects at the microscope stage.

In U.S. Pat. No. 2,381,634 to Back a flat rear projection screen is used in a screw-thread testing device in which the shadow of the screw thread and an outline of a testing member are projected onto the screen.

SUMMARY OF THE INVENTION

The present invention is directed to a projection system in which the material on the wall of a test tube may be accurately projected to form an enlarged and accurate image of that material. This projection system finds particular application in blood banks and immunohematology laboratories and may be used in connection with the determination of the hemagglutination of blood corpuscles directly in the test tube in which the hemagglutination reaction occurs.

The projection system includes a base and a test tube holding means mounted on the base. The test tube holding means positions a test tube which is inserted into the projection system at an angle other than the vertical and horizontal, for example, about 30 degrees from the horizontal. The conventional test tube consists of a tubular portion which is circular in cross-section and has a convex closed bottom and an open top, with an imaginary axis along the center line of the tubular portion. The test tube is of a transparent material such as glass or hard plastic resin. Consequently, in the projector of the present invention, the test tube is positioned so that its imaginary central axis is about 30 degrees from the horizontal.

An enclosure means, such as a cabinet, which is a light-tight cabinet, is mounted on the base and encloses the test tube positioning means and the other elements of the projection system. A light source is positioned on one side of the test tube and has its beam directed through the test tube. A suitable light source would be a conventional projector bulb or a halide quartz bulb and a set of condensing lenses which form a thin relatively high intensity beam of light in a small area on the tube. The beam of light may be directed through a color filter and is then directed through the material clinging on the test tube above the level of the liquid. It will be noted that the liquid material cannot be opaque. However, generally liquid materials, such as blood and chemical test reagents, when they are in the form of a thin layer or film on a test tube wall, are not sufficiently opaque to stop the light beam and consequently may be viewed using the projection system of the present invention.

A projection lens system is positioned on the side of the test tube opposite to the light source. The projection lens system receives the light beam and the image of the liquid material on the wall of the test tube. A suitable projection lens system would include a compensating condensing lens and may be of the same type as is found in conventional photographic slide projectors. The lens system projects its image onto a curved rear viewing screen whose curvature is carefully matched so that it is substantially the same curvature as the curvature of the test tube but much larger in diameter. The interior concave side of the viewing screen will generally be a section of a right tubular cylinder, i.e., the imaginary tubular cylinder would be circular in cross-section. The curvature of that round cylinder is substantially the same, although greatly enlarged, as the curvature of the test tube. A suitable rear viewing screen is formed of a plastic material having silica or other light diffusing material on its rear surface. In one embodiment the projection lens may be moved to match the various sized test tubes.

In the preferred embodiment of the present invention the test tube has what would normally be its open portion exterior of the enclosure. It is held about 30° from the horizontal, so the liquid does not escape, and slowly rotated by hand.

The slow rotation of the test tube causes a thin film or layer of the liquid within the test tube to form on the interior wall of the test tube above the level of the liquid within the tube. The tube may not be filled with liquid during the projection. The optimum speed of rotation, and the possibility of forming such a layer, depends upon the thickness of the material and its degree of adhesion (clinging) to the interior wall of the test tube. There are many materials which form a gel or are too thick and cohesive and consequently will not spread out to form a thin optically translucent or transparent layer on the test tube wall. The projection system of the present invention is not suitable for use with those materials. However, there are other materials, an example of which is the blood after an antigen-antibody reaction, which form a suitable layer on the test tube wall.

In one embodiment of the invention the test tube is automatically rotated by a motor after it is inserted within the projection system. In this embodiment a switch is automatically closed by the inner end, i.e., the curved end, of the test tube and a small motor driven rubber wheel is brought against the test tube to rotate it slowly. For example, the test tube may be rotated at the rate of ½ to 4 revolutions per minute.

In another embodiment the insertion of the test tube operates a micro-switch which turns on the lamp, and a blower to cool the lamp. When the test tube is withdrawn, releasing the micro-switch, the lamp is extinguished. However, the blower, due to a timing delay device, will continue to operate for about one-half of a minute.

OBJECTIVES AND FEATURES OF THE INVENTION

It is an objective of the present invention to provide a projection system in which an image is displayed which is an enlargement of the material formed in a layer on the interior wall of a generally tilted positioned test tube.

It is a further objective of the present invention to provide such a projection system for the determination, directly in the test tube, of hemagglutination of blood corpuscles.

It is a further objective of the present invention to provide such a projection system which will function with a variety of commonly used sizes of test tubes and which may be readily adjusted to accommodate such differently sized test tubes, for example, by using plastic inserts on the differently sized tubes.

It is a further objective of the present invention to provide such a projection system which would be relatively low in cost and rugged in operation so that it may be utilized by relatively inexperienced laboratory personnel.

It is a further objective of the present invention to provide such a projection system in which an enlarged image is projected which may be viewed by a number of laboratory personnel at the same time and thereby enable them to discuss the projected image.

It is a further objective of the present invention to provide such a projection system in which the image would be of sufficient accuracy and sufficient clarity so that it may be photographed for future reference.

It is a feature of the present invention to provide a projection system for the viewing of an enlarged image of a layer of material, such as blood, on the interior of a test tube wall. The projection system includes a test tube having a curved wall with a predetermined curvature and a holding means on the base for removably positioning the test tube at an angle to the vertical and permitting the test tube to be rotated about its axis. The system also includes a light source positioned on one side of the test tube and directed to shine its light through the test tube and through the layer of material on the curved test tube wall, and a projection lens means mounted on the base to receive the lighted image of the material and project the image of the layer of material. The system also includes a curved screen upon which the projection lens means projects the image, the curvature of said screen being substantially the same curvature as the curvature of the test tube wall but the screen curvature being much larger than that of the test tube.

It is a further feature of the present invention that the projection screen is a rear projection screen having convex and concave sides whose concave side receives the image and whose convex side shows the image for viewing, thus enabling the device to be used in a well-lit room.

BRIEF DESCRIPTION OF THE DRAWINGS

Other objectives and features of the present invention will be apparent from the detailed description which follows, which sets forth the inventor's best mode for practicing the invention. The following detailed description should be taken in conjunction with the accompanying drawings.

In the accompanying drawings.

DETAILED DESCRIPTION OF THE INVENTION

Figure 1:
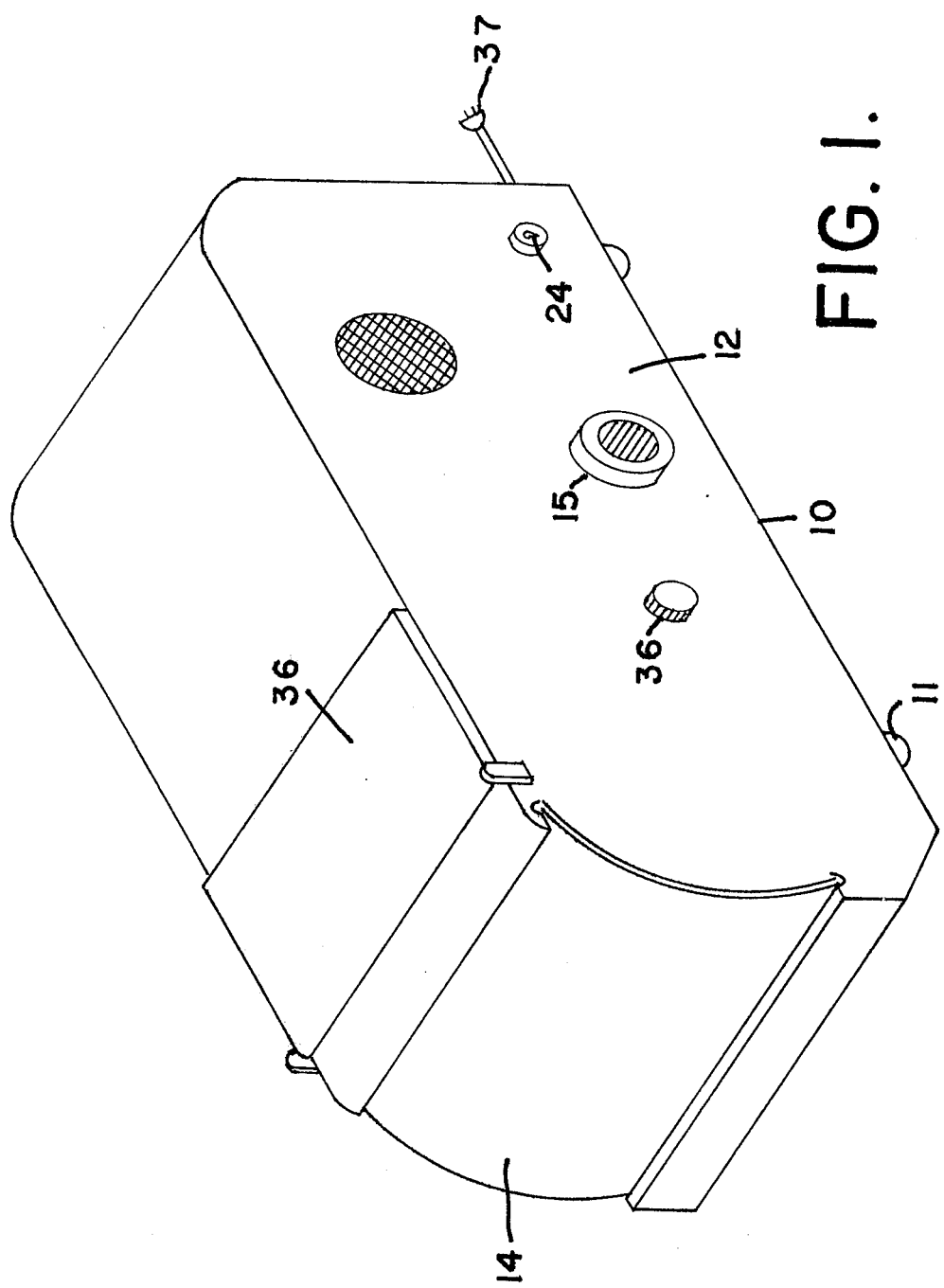
FIG. 1 is a perspective view of the projection system of the present invention.

As shown in FIG. 1, the projection system of the present invention is mounted on a base 10. The base 10 includes rubber feet 11 so that the base may be positioned on the top of a laboratory workbench. An enclosing cabinet 12, which is the enclosing means, is removably secured to the base 10. The cabinet 12 is light-tight and for that purpose is made of an optically opaque material. Preferably the base is relatively heavy so that the device is not easily titled over and is preferably formed by stamping from sheet metal, although, alternatively, for a heavier base the base may be formed of cast metal. The cabinet 12 is of a lighter material, so that it may be readily removed and may be formed of an opaque injection-molded plastic resin which is relatively shock-resistant and scratch-resistant, such as ABS plastic.

The enclosing cabinet 12 has mounted thereon a rear projection screen 14. The rear projection screen 14 may be of glass having one ground side or may be of glass or a stiff clear plastic such as polymethyl methacrylate sheet of optical grade and having on its rear surface an optically diffusive and translucent material such as a synthetic amorphous silica of generally micron-sized particles. A suitable rear projection screen is described in U.S. Pat. No. 3,598,640 to Frank P. Bennett, issued Aug. 10, 1971, whose teachings are incorporated by reference herein for the teaching of the method and product of the rear projection screen.

The rear projection screen 14 is curved with a predetermined curvature, so that its inside face is concave and its outside face, which is the viewing face, of the screen 14 is convex. The screen may have a suitable thickness of 1/10 or less of an inch. The curvature of the screen is such that the screen is a portion of the surface of a right circular cylinder having an imaginary central axis. The lateral area of a right circular cylinder is $2\pi rw$, where $w$ is the horizontal width. So if the screen is, for example, a rectangular edge portion having one-eighth the area of the cylinder, its cross-section is the surface of an imaginary sector of 45° and its area is $\frac{1}{4} r w \pi$. For example, the screen has a rectangular border (edge) and is about one-eighth of the circumference of an imaginary tube. That imaginary tube is circular in cross-section and has a preferred radius of 6 inches and preferably is about 5 inches in horizontal width ($w$) and its area is $\frac{1}{4}\pi r w$ or $\frac{1}{4} \pi$. 6.5 or 23.7 sq. inches. The imaginary axis of the imaginary cylinder, of which the screen is a portion, is horizontally aligned.

The center of the imaginary cylinder is the center of curvature of the screen and it is taken either at the center axis of the test tube or between that axis and the best tube wall. With a test tube of 10 mm diameter, that difference is only 2½mm and may be compensated by adjusting the projection lens.

In the illustrated embodiment, the curvature of the screen is fixed and its distance from the center of the test tube is also fixed. The most popular sized test tubes are 12 × 75 mm and 10 × 75 mm, the respective numbers 10 and 12 referring to the diameter of the test tubes in millimeters. Consequently, the distance from the test tube wall to the screen may vary, for example, by 2 mm, and the projection lens should be variable in position to take account of such test tube diameter differences. The term "test tube", as used herein, is intended to cover any container which has a curved wall, for example, an elongated cylindrical bottle or flask.

Figure 2:
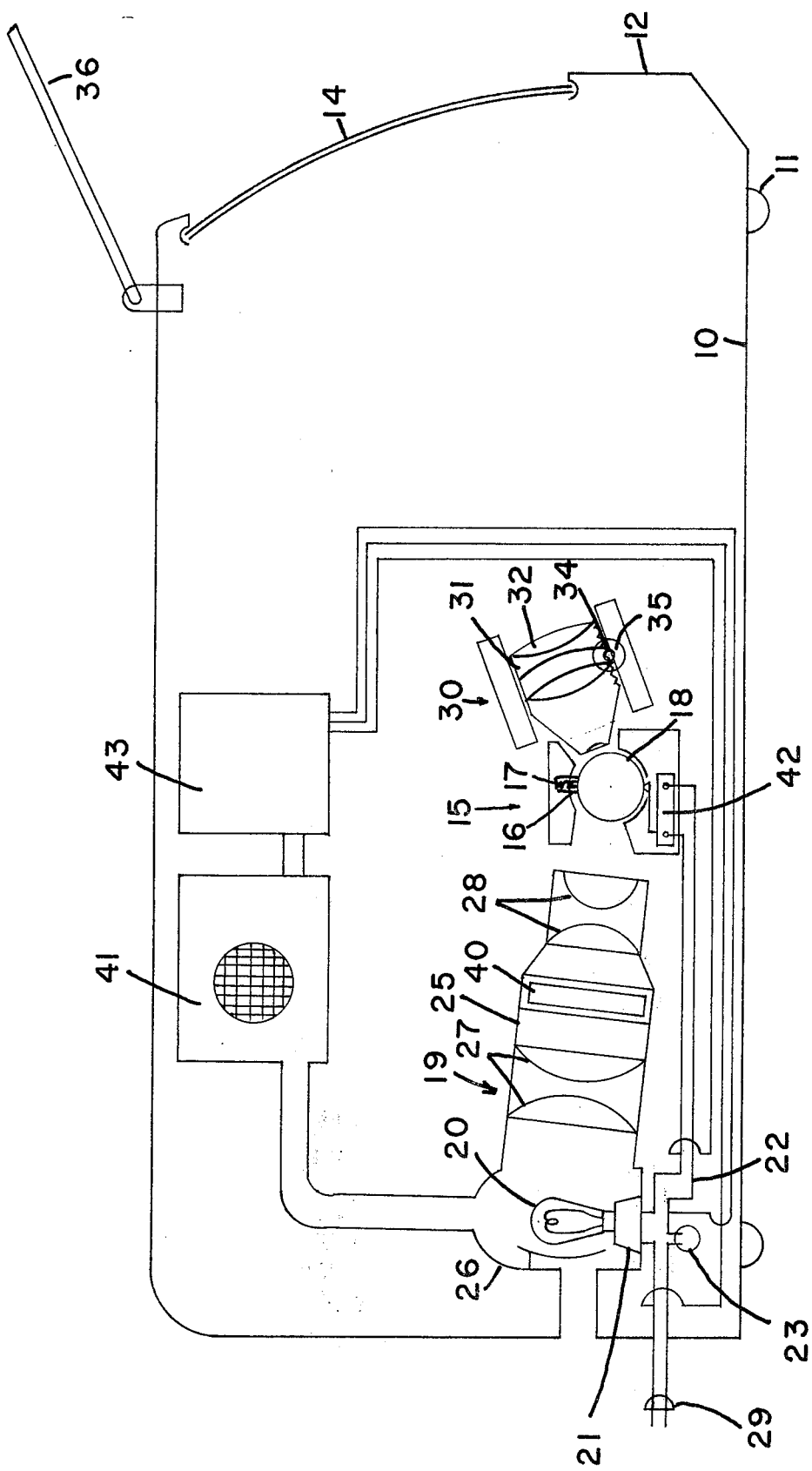
FIG. 2 is a cross-sectional view of the projection system of FIG. 1.

As shown in FIG. 2, a test tube holding means 15 is located on the base 10. The holding means comprises a holder 15 having plungers 16 which are spring-loaded by springs 17. These spring-loaded plungers 16 removably position and retain the test tube 18 within the test tube holder 15. The test tube 16 is positioned in the holding means 15 so that its imaginary central axis of the test tube is between 30° and 60° from the horizontal, with its open mouth upwardly directed. In any event, the test tube is held at an angle to the vertical and to the horizontal. If, however, the test tube is closed, for example, by a rubber stopper, it may be positioned horizontally. The term "angle to the vertical", as used herein, means that the axis of the test tube is not vertical but rather is at some angle relative to the vertical direction. Preferably, the test tube in the holding means is about 20° to the horizontal and between 10° and 40° to the horizontal.

A light source 19 is also located within the enclosure. The light source includes a bulb 20 which is a conventional projection bulb of the tungsten filament type. Alternatively, the bult may be a quartz-halogen bulb, for example, the "ELH" lamp having an internal heat-dissipating dichroic reflector and available from General Electric Co. The bulb 20 is removably mounted, for example, by bayonet prongs, in a bulb holder 21 which is connected by wire 22 to the switch 23. A wire leads from the switch and from the wire 22 to a conventional electrical plug 29 which is intended to be inserted into a 100-volt a.c. household electrical receptacle.

Preferably the electric projector bulb is cooled by a blower 41 which blows air on the bulb. The blower is preferably an electric motor driven turbine blade fan, i.e., a "turbo blower." The "ELH" quartz-halogen lamp, mentioned above, is a relatively cool lamp and permits the use of a relatively quite lower speed blower.

In one embodiment of the present invention, the lower closed end of the test tube rests upon, the activates, an arm of a micro-switch positioned at an end of the test tube holding means 15. That micro-switch turns on the light source and the blower. They remain on as long as the test tube rests on the micro-switch arm. When the operator removes the test tube, the light source is immediately extinguished but the blower continues to operate, for example, for 30 seconds, by means of a time delay circuit 43.

The bulb 20 is enclosed within a tubular member 25 having a closed end 26 and a series of two condensing lenses 27 and 28. The light from bulb 20 is focused by two sets of condensing lenses 27 and 28 to form a thin beam of light which is directed through the removable filter 40 and then through the walls of the test tube 18. The filter 40, in analysis of blood, will generally be a blue filter. That beam of light is thereby directed through the thin layer of material on the wall of the test tube 18 and through the projection lens system 30, which is also mounted on base 10.

The projection lens system 30 includes a tubular enclosure 31 which carries a rack 34 (a flat geared member). A gear 35 meshes with rack 34 and the gear 35 is rotated by handle 37 exterior to the cabinet 12. The user rotates the handle 37 and thereby rotates the gear 35, pivotly mounted on the cabinet, to move the tubular enclosure 31. Such movement adjusts the focus so that different sizes (different diameters) of test tubes may be accommodated. The tubular enclosure 31 mounts a projection lens 32 which may, for example, be a commercially available three-element lens of f/2.0 and a focal length of 2 to 5 mm. The projection lens system 30 directs its image, that is, the image of the material on the wall of the test tube, onto the convex face (rear face) of the rear projection screen 14. An opaque shield 36 is pivotly mounted on the cabinet so that, when lowered as in FIG. 2, it acts as a light shield for the screen.

A somewhat shorter cabinet may be employed by utilizing a flat mirror reflector positioned at an angle, for example, a 90° angle, between the projection lens and the screen. The image from the projection lens would be reflected from the mirror onto the rear of the screen.

The test tube, once it is within the test tube holding means, may be slowly rotated by a motor means (not shown). A suitable motor means would include a small a.c. motor controlled by a switch on the cabinet, a reduction gear system connected to the shaft of the motor, and a rubber wheel driven by the gear system and adapted to touch and rotate the test tube.

An optical system according to the present invention has been built using a focusing lens of f 1.9 and 13mm focal length and displaying the contents of the wall of 10 × 75 mm test tubes. A series of experiments were conducted to determine the curvature of the rear projection screen using that lens and test tube size. The rear projection screen in all cases was a sector of a right cylinder. In other words the curvature, in cross-section, was a sector of an imaginary circle. However, the radius of that imaginary circle differed. Having regard to FIG. 2, X is defined as being the distance from the center of the test tube (the imaginary axis of the test tube 18) to the inner surface of the rear projection screen 14 along the shortest line when the most sharp focus of the focusing lens is obtained. In the case of the f 1.9 lens X was 3 inches (7.62 cm). Then the center of the imaginary circle of the cross-section of the screen 14 may be in the range of ½ X (as the shortest radius) to 3 X (as the longest radius).

In the present invention the focusing lens is in the range of f 1.2 to f 11 and is preferably in the range of f 1.8 to f 5.6. As is known from photography difference lenses have different depth of fields depending on the lens and on their f stop. If the lens is slower the diaphragm may be closed down, which will increase the depth of field. In that case the curvature of the screen is not as critical. In addition, as the diameter of the test tube increases the screen radius would also increase. The curvature of the screen (i.e., the center of the imaginary circle) depends on where the screen is placed in relation to the test tube. If the screen is nearer to the test tube it would have a smaller radius that if it is further away.

The screen 14 may be mounted to be easily replaced by another alternative rear projection screen having a different curvature (different radius of imaginary circle). The lens system 30 may be replaced by a zoom type of focusing lens or by a lens turret carrying two, three or more lenses, each of which may be shifted into the optical path.

In another embodiment of the present invention a test tube holder is provided that has sleeve inserts. Those inserts will have the same outer diameter but different inner bore diameters to accurately accommodate different diameter test tubes, depending on which sleeve is used. Such sleeves may be used with a test tube holder which accommodates the uniform outer diameter of the sleeves.

What is claimed is:

1. A projection system for the viewing of an enlarged image of a layer of material temporarily formed on the interior of a test tube wall, comprising
   a test tube having a curved wall with a predetermined curvature;
   a base;
   a holding means on the base to removably position the test tube at an angle to the vertical, said test tube being rotatable about its axis, the said angle to the vertical and rotation is such that a layer of material temporarily adheres to said interior wall above the normal level of the material in the test tube,
   a light source positioned on one side of said test tube and directed to shine its light through said test tube and through said layer of material on the curved test tube wall;
   a projection lens means mounted on said base to receive said lighted image of said material and focus upon and project an enlarged image of said layer of material; and
   a curved projection screen upon which said projection lens means projects its image, the curvature of said screen being substantially similar to the curvature of said test tube wall but on an enlarged scale, said projection screen having a concave side which receives said projected image and a convex side showing said image for viewing.

2. A projection system as in claim 1 wherein said test tube has a tubular portion round in cross-section and said screen is a portion of a light circular cylinder.

3. A projection system as in claim 2 wherein said screen has a rectangular edge.

4. A projection system as in claim 1 and further including an enclosure means on said base for enclosing said light source, said test tube positioning means, and said projection lens means; said enclosure means having mounted thereon said screen, said enclosure means having an opening through which said test tube is inserted, and said enclosure means preventing the escape of light from said light source except through said screen.

5. A projection system as in claim 1 wherein the test tube has a tubular portion with an imaginary axis and said holding means positions the said test tube so that its axis is substantially horizontal.

6. A projection system as in claim 1 wherein said light source includes an electric bulb, a tubular member enclosing said bulb, and a condensing lens mounted on said tubular member to focus the light from said light bulb.

7. A projection system as in claim 1 wherein said projection lens means includes a tubular member and a convex-convex lens mounted in said tubular member.

8. A projection system for the viewing of an enlarged image of a layer of material on the interior of a test tube wall, comprising
   a base;
   a test tube partly filled with a liquid and having a tubular portion which is circular in cross-section;
   a holding means on the base to removably position the test tube, said test tube is rotated about its axis such that a layer of material temporarily adheres to said interior wall above the normal level of the material in the test tube, wherein the test tube tubular portion has an imaginary axis and said holding means positions the said test tube so that the test tube axis is from 10°–40° from the horizontal;
   a light source positioned on one side of said test tube and directed to shine its light through said test tube and through said layer of material on the test tube wall above the level of said liquid;
   a projection lens means mounted on said base to receive said lighted image of said material and project the enlarged image of said layer of material;
   a curved concave-convex rear projection screen upon which said projection lens means projects its image, the image being projected on the concave side of the screen and being viewed on the convex side of the screen, said screen being a portion of a right circular cylinder; and
   an enclosure means on said base for enclosing said light source, said test tube positioning means, and said projection lens means; said enclosure means having mounted thereon said screen and said enclosure means having an opening through which said test tube is inserted.

9. The method of projecting and viewing an enlarged image of a layer of material on the interior of a test tube wall, comprising the steps of:
   placing a liquid within a test tube to partially fill said test tube, the test tube having a curved wall with a predetermined curvature;
   removably positioning the test tube at an angle to the vertical in a projection system; said angle being sufficient to form a layer of material adhering to the interior wall of the test tube upon rotation of the test tube;
   slowly rotating said test tube about its axis to permit the liquid to form said layer on the test tube wall above the normal level of the material in the test tube;
   positioning a light source on one side of said test tube and directing its light through said test tube and through said layer of material on the curved test tube wall;
   receiving said lighted image of said material in a projection lens and projecting an enlarged image of said layer of material within said lens; and
   projecting said enlarged image on a curved screen, the curvature of said screen being substantially similar to the curvature of said test tube wall but on an enlarged scale.

* * * * *

UNITED STATES PATENT OFFICE
CERTIFICATE OF CORRECTION

Patent No. 4,120,575   Dated October 17, 1978

Inventor(s) Bert Bach

It is certified that error appears in the above-identified patent and that said Letters Patent are hereby corrected as shown below:

Column 1, line 21, "later" changed to --layer--;

Column 6, line 60, "bult" changed to --bulb--;

Column 7, line 8, "the" (second occurrence) changed to --and--

Signed and Sealed this

Thirteenth Day of March 1979

[SEAL]

Attest:

RUTH C. MASON
Attesting Officer

DONALD W. BANNER
Commissioner of Patents and Trademarks